(12) United States Patent
Higgins et al.

(10) Patent No.: US 8,250,585 B2
(45) Date of Patent: Aug. 21, 2012

(54) EXTENSIBLE FRAMEWORK FOR MANAGING UI STATE IN A COMPOSITE AJAX APPLICATION

(75) Inventors: William P. Higgins, Durham, NC (US); Walter J. Staiger, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1257 days.

(21) Appl. No.: 11/934,848

(22) Filed: Nov. 5, 2007

(65) Prior Publication Data

US 2009/0119675 A1 May 7, 2009

(51) Int. Cl.
*G06F 13/00* (2006.01)
(52) U.S. Cl. ....................................................... 719/311
(58) Field of Classification Search ........................ None
See application file for complete search history.

(56) References Cited

U.S. PATENT DOCUMENTS

2007/0214239 A1* 9/2007 Mechkov et al. ............. 709/219
2008/0282175 A1* 11/2008 Costin et al. .................. 715/760
2008/0313206 A1* 12/2008 Kordun et al. ................ 707/102

* cited by examiner

*Primary Examiner* — S. Sough
*Assistant Examiner* — Carina Yun
(74) *Attorney, Agent, or Firm* — Hamilton & Terrile, LLP; Stephen A. Terrile

(57) ABSTRACT

A method, system and computer-usable medium are disclosed for managing the user interface (UI) state of an AJAX application by automatically binding a uniform resource locator (URL) to an application code component. The metadata for controller functions contained in an AJAX Web page are read as it is loaded. Once loaded, the URL of the page is monitored for changes in its value. If the URL's value changes, then the value of the 'action' property of the changed URL is compared to the application metadata for validation. If the 'action' property of the changed URL does not exist in the application metadata, then the changed URL is considered invalid and its associated actions are ignored. If the 'action' property is valid, the function specified by the 'action' request parameter is called. A single object parameter is sent, with the properties of the single object parameter derived from the request parameters other than 'action'. The function is executed and the page is updated to display the value of the object property.

20 Claims, 5 Drawing Sheets

EXTENSIBLE FRAMEWORK FOR MANAGING UI STATE IN A COMPOSITE AJAX APPLICATION

BACKGROUND OF THE INVENTION

1. Field of the Invention

Embodiments of the disclosure relate in general to the field of computers and similar technologies, and in particular to software utilized in this field. Still more particularly, the present invention relates to an improved method and system for managing the user interface (UI) state in an Asynchronous Javascript And eXtensible Markup Language (AJAX) application.

2. Description of the Related Art

Composite applications consist of functionality drawn from multiple sources, often delivered within a service oriented architecture (SOA). The components that make up a composite application may be individual Web services, selected functions from within other applications, or entire systems whose outputs have been packaged as Web services. These components, typically contributed from multiple, independent sources, are executable within the same runtime context. However, conventional methods of implementing composite Web applications (e.g., IBM's WebSphere Portal, Eclipse, and Microsoft's .NET) do not address the relatively new domain of rich Web applications, such as those developed with Asynchronous Javascript And eXtensible Markup Language (AJAX). Composite applications created with AJAX are incrementally updated by dynamically exchanging small amounts of data between their Web pages and their contributing Web servers. As a result, Web pages do not have to be reloaded in their entirety when they are updated and composite applications feel more responsive and interactive.

The Java programming language is an object-oriented programming language, which utilizes high-level syntax derived from C and C++, but includes a simpler object model with fewer low-level facilities. (Java is a trademark of Sun Microsystems). Java programs are typically compiled into bytecode, which can either be interpreted at run time or compiled into native machine code for execution. Java programs utilize configurable security features to enable selective restriction of network and/or file access operations. AJAX utilizes a client side script language, such as Javascript, along with eXtensible Markup Language (XML), to enable the creation of the initial conditions for the evolution of dynamic, intuitive, complex, and data-centric user interfaces in Web pages. Accordingly, AJAX increases the speed, interactivity, and ease-of-use of Web pages.

However, this same flexibility can also create issues in composite Web applications, as the AJAX framework that displays contributed user interface (UI) functionality does not know which code it may have to invoke until run-time. Since AJAX applications run within the context of a single HTML page, common Web browser functions such as the back, forward, history, and bookmarking buttons may fail. A known approach to this issue is to denote page state by adding information after the URL hash ('#'). If the value after the hash changes, then the Web page is not refreshed. Currently, no solution exists to automatically bind an AJAX uniform resource locator (URL) to application code in an extensible composite application. As a result, both intra- and inter-component dependencies are tightly coupled, which results in additional effort to maintain and validate related application code.

BRIEF SUMMARY OF THE INVENTION

The present invention includes, but is not limited to, a method, system and computer-usable medium for managing the user interface (UI) state of an Asynchronous Javascript And eXtensible Markup Language (AJAX) application by automatically binding a uniform resource locator (URL) to an application code component. In various embodiments, an AJAX Web page is accessed with a browser and the application metadata for all controller functions contained in the page are read as it is loaded. In one embodiment, each controller function comprises a unique ID, which is typically expressed as a string following a reverse domain name service (DNS) naming convention (e.g., com.ibm.team.workitem.Web.actions.viewbug). Each controller function also comprises a named Javascript function appended to an object hierarchy matching the reverse DNS convention (e.g., com.ibm.team.workitem.Web.actions.viewbug). Each controller function likewise comprises a human-readable description that is displayed in the browser's title bar when the 'action' is invoked.

Once the AJAX Web page is loaded, it is displayed in the browser and its URL is monitored in background to detect changes in its value. If the value of the URL changes, then the value of the 'action' property of the changed URL is compared to the application metadata contained in the AJAX Web page to validate its validity. If the 'action' property of the changed URL does not exist in the application metadata, then the changed URL is considered invalid and its associated actions are ignored. However, if the 'action' property of the changed URL is valid, then the Javascript function specified by the 'action' request parameter is called. As a result of the function call, a single object parameter is sent, with the properties of the single object parameter derived from the request parameters other than 'action'. The called Javascript function is executed and the AJAX page is updated to display the value of the Javascript object property.

In another embodiment, the AJAX Web page comprises Jazz Web UI components, which are stored in an extension registry. The Jazz Web UI components are operable to extend an extension point, which are exposed as a Uniform Resource Identifier (URI). Cached strings of Javascript code are generated from the Jazz Web UI components and are then executed to register available Jazz Web UI components in an AJAX framework. A subset of the extension registry is serialized, with the subset comprising server side extension points declared within the available Jazz Web UI components registered in the AJAX framework. The serialized subset of the extension registry is then parsed such that it can be accessed through a Javascript Application Programming Interface (API) to determine if the ID of the action property of a changed URL exists in the extension registry. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
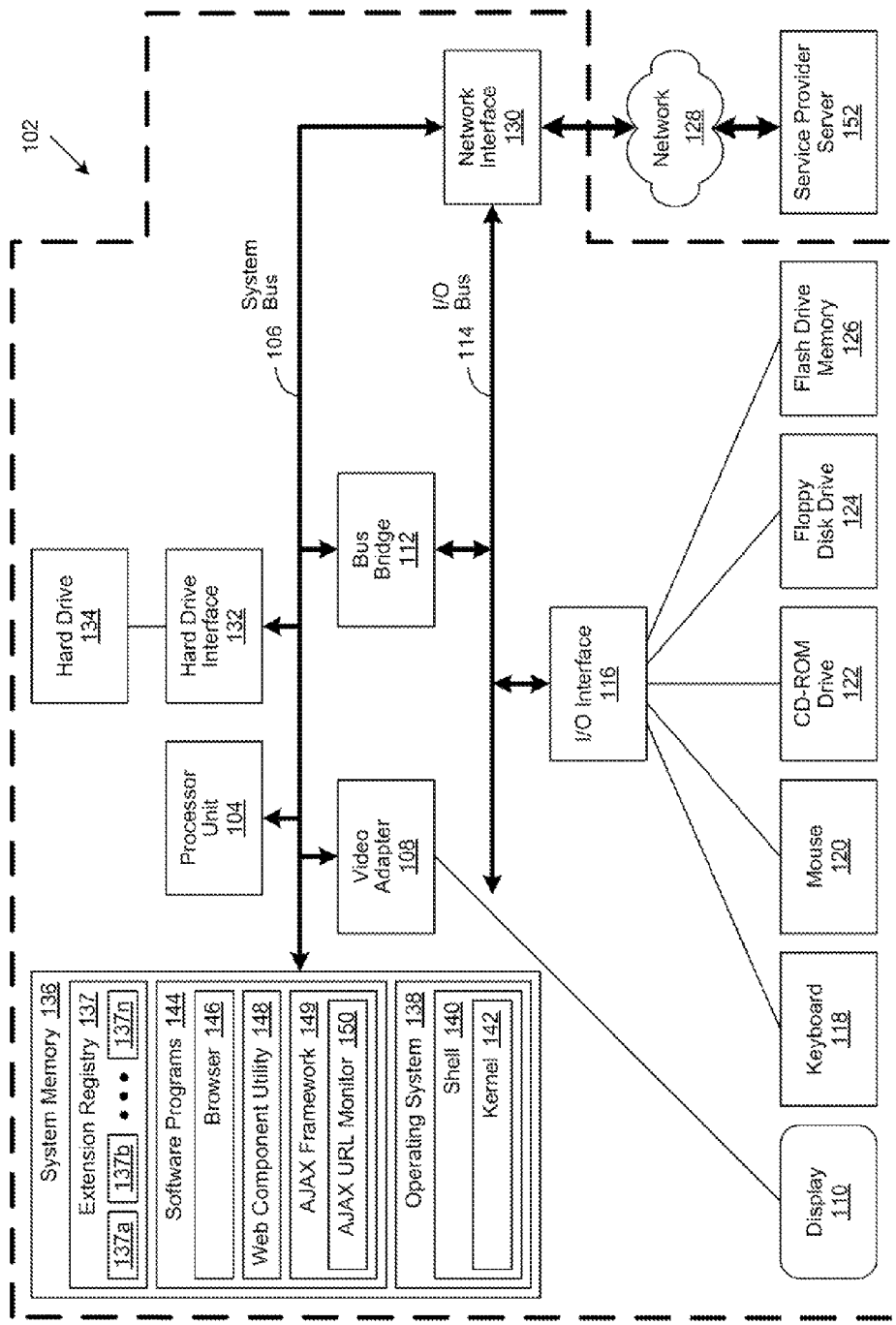
FIG. 1 depicts an exemplary client computer in which the present invention may be implemented.

A method, system and computer-usable medium are disclosed for managing the user interface (UI) state of an Asynchronous Javascript And eXtensible Markup Language (AJAX) application by automatically binding a uniform resource locator (URL) to an application code component. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144, and an extension registry 137. Extension registry 137 includes multiple extension points 137a through 137n, where n is an integer. In another embodiment, extension registry 137 may instead be located in service provider server 152.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc. As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a Web component utility 148 and an AJAX framework 149, further comprising an AJAX uniform resource locator (URL) monitor 150. The extension registry 137, Web component utility 148, AJAX framework 149, and AJAX uniform resource locator (URL) monitor 150 includes code for implementing the processes described hereinbelow in FIGS. 2-3. In one embodiment, client computer 102 is able to download the extension registry 137, the Web component utility 148, the AJAX framework 149, and the AJAX uniform resource locator (URL) monitor 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2A:
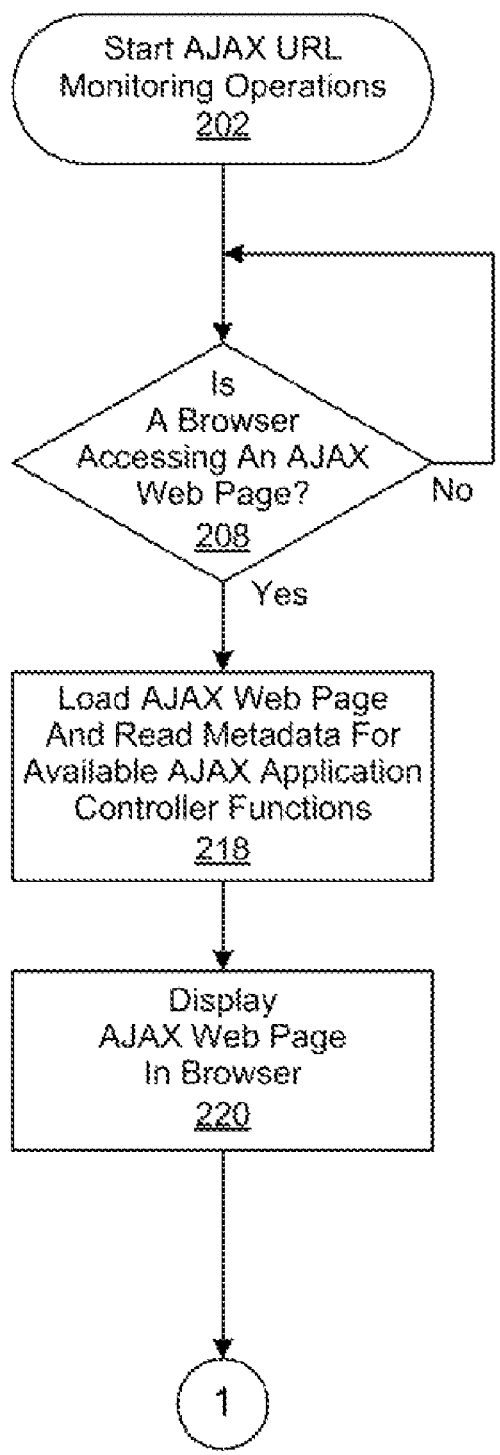
FIGS. 2a and 2b, generally referred to herein as FIG. 2, are generalized flowcharts showing an exemplary method of managing the user interface (UI) state of an AJAX application.
Figure 2B:
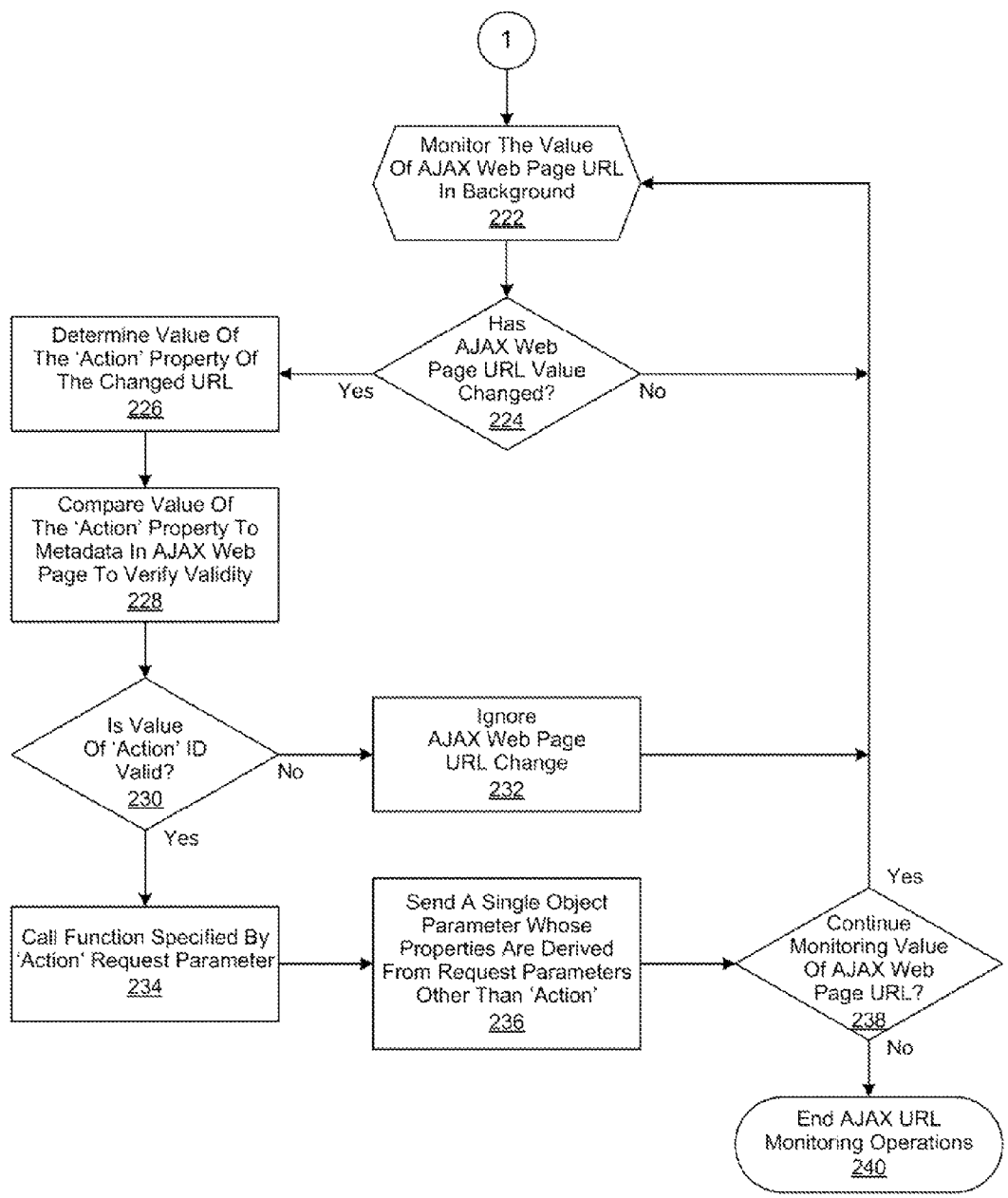

FIG. 2 is a generalized flowchart showing a method of managing the user interface (UI) state of an AJAX application by automatically binding a uniform resource locator (URL) to an application code component in accordance with an embodiment of the invention. AJAX URL monitoring operations begin in step 202 in response to computer 102 accessing network 128. A determination is then made in step 208 whether a browser, such as browser 146, is accessing an AJAX Web page. If it is determined in step 208 that the browser 146 is not accessing an AJAX Web page, then the process returns to step 208 and is repeated. However, if it is determined in step 208 that the browser 146 is accessing an AJAX Web page, then the AJAX Web page is loaded in step 218 and application metadata for all controller functions contained in the AJAX page are read.

In one embodiment, each controller function comprises a unique ID, which is typically expressed as a string following a reverse domain name service (DNS) naming convention (e.g., com.ibm.team.workitem.Web.actions.viewbug). Each controller function also comprises a named Javascript function appended to an object hierarchy matching the reverse DNS convention (e.g., com.ibm.team.workitem.Web.actions.viewbug). Each controller function likewise comprises a human-readable description that is displayed in the browser's title bar when the action is invoked. Once the AJAX Web page is loaded, it is displayed in the browser in step 220.

Then, in step 222, the AJAX URL monitor 150 monitors the AJAX Web page URL in background at a predetermined rate (e.g., four times per second) for changes in its value. A determination is then made in step 224 whether the URL value of the AJAX Web page has changed. If it has not, then monitoring of the value of the AJAX Web page URL is continued in step 222. However, if it is determined in step 224 that the value of the Jazz Web page URL has changed, then the value of the 'action' property of the changed URL is determined in step 226.

As an example, a user clicks on a hyperlink within the AJAX Web UI page for the "viewBug" function for bug #1234. As a result, the browser URL is changed from:
    http://example.com/ajaxPage
to:
    http://example.com/ajaxPage#action=com.ibm.team.workitem.Web.actions.viewBug&id=1234

The value of the 'action' property of the changed URL is then compared in step 228 to the application metadata contained in the AJAX Web page to validate its validity. A determination is then made in step 230 whether the ID of the 'action' property of the changed URL is valid. To continue the prior example, the comparison operations ensure that there is an 'action' with the ID "com.ibm.team.workitem.Web.actions.viewBug" defined in the application metadata of the AJAX Web page. If there is not, then the changed URL, and its associated actions, is ignored in step 232, followed by continued monitoring of the value of the AJAX Web page URL in step 222. It will appreciated by those of skill in the art that checking the validity of the 'action' property of the changed URL against the application metadata of the AJAX Web page provides a means to prevent the running of arbitrary, and possibly malicious, code via the AJAX framework 149.

However, if it is determined in step 230 that the ID of the 'action' property of the changed URL is valid, then the function specified by the 'action' request parameter is called in step 234. As a result of the function call in step 234, a single object parameter is sent in step 236. The properties of the single object parameter are derived from the request parameters other than 'action'. To further continue the previous example, calling the function associated with the ID of the 'action' property results in the sending of a single Javascript object with the property {id:'1234'}. The function executes and the framework updates the AJAX page's title bar in the browser UI, substituting '1234' for the ${id} parameter. The user now sees a meaningful description in both the browser title bar and later in the browser history.

It will be apparent to those of skill in the art that additional links representing other UI states in the AJAX Web page could be executed in the same manner. Once the single object parameter is sent in step 234, a determination is made in step 238 whether to continue monitoring the value of the AJAX Web page URL. If so, then monitoring of the value of the AJAX Web page URL is continued in step 222. Otherwise, AJAX URL monitoring operations are ended in step 240.

Figure 3A:
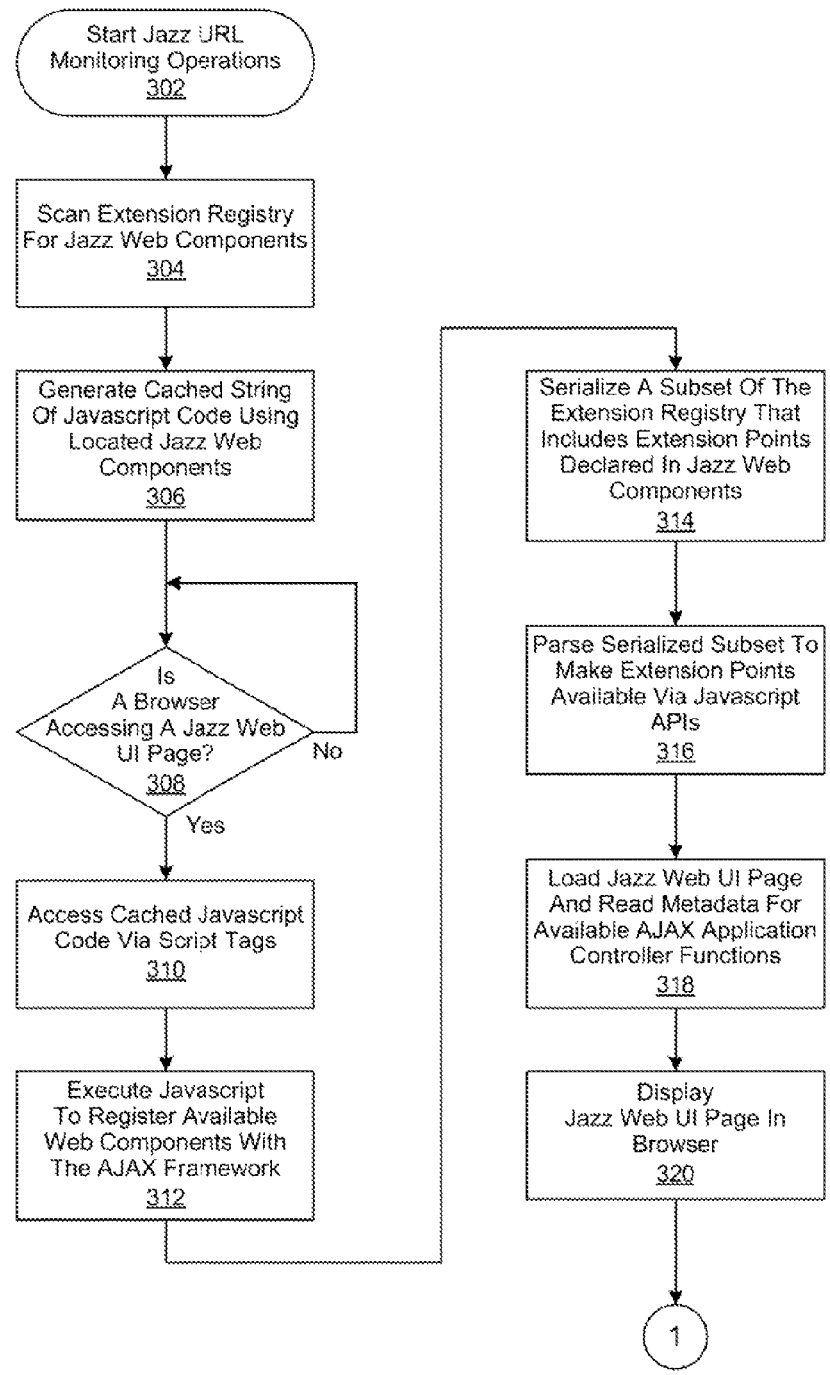
FIGS. 3a and 3b, generally referred to herein as FIG. 3, are generalized flowcharts showing an exemplary method of managing the user interface (UI) state of an extensible Jazz application.
Figure 3B:
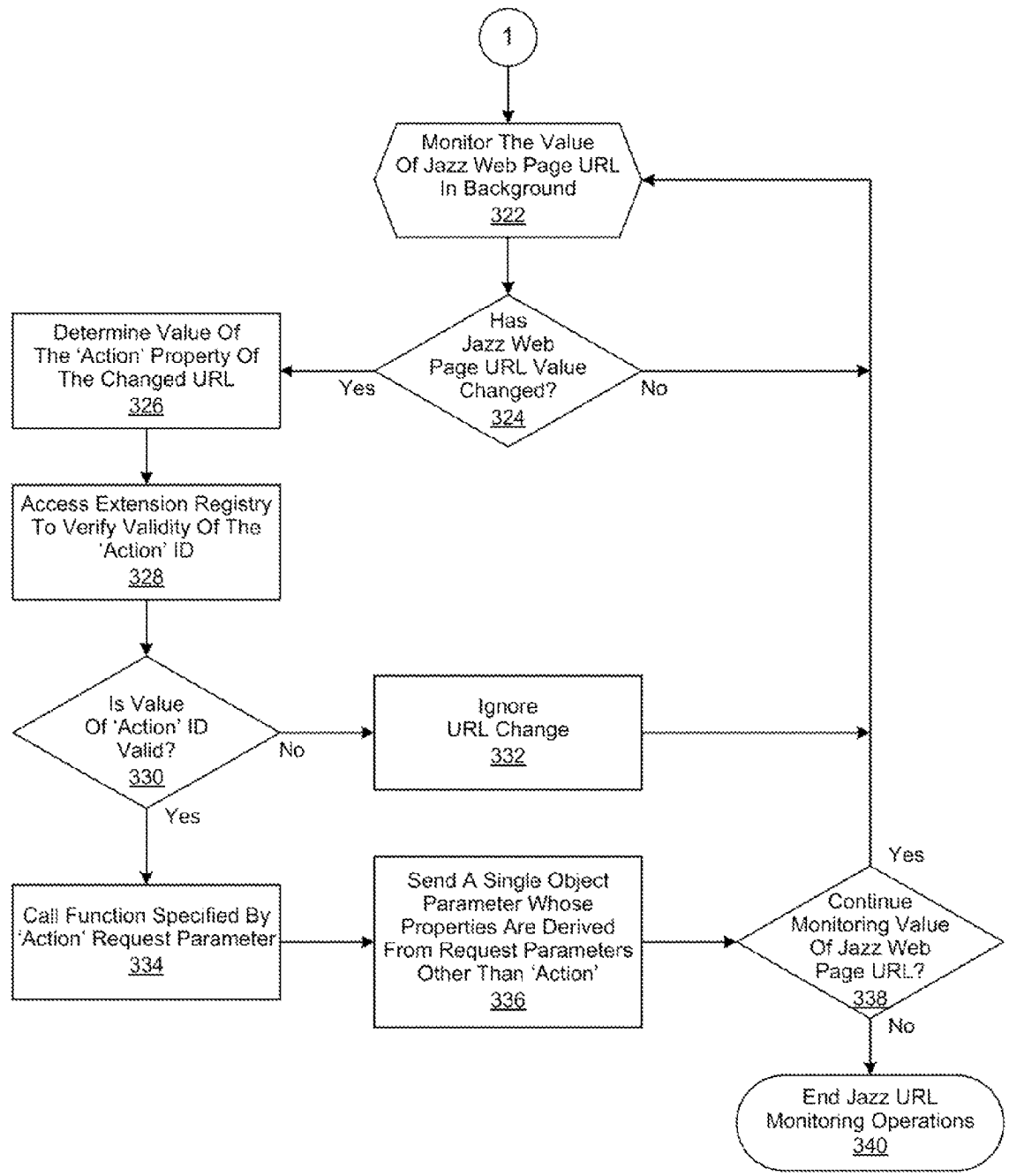

FIG. 3 is a generalized flowchart showing an exemplary method of managing the user interface (UI) state of an extensible Jazz application (i.e., scalable team collaboration platform for integrating tasks across a software lifecycle) by automatically binding a uniform resource locator (URL) to an application code component in accordance with an embodiment of the invention. Jazz URL monitoring operations begin in step 302 in response to computer 102 accessing network 128. In step 304, Web component utility 148 scans extension registry 137 for Jazz Web components. As utilized herein, Jazz Web components are defined as Web modules that extend an extension point (e.g., com.ibm.team.repository.Web.Web-Bundles) and are automatically exposed on the network 128 at the uniform resource identifier (URI) [server-root]/Web/[module-id]. In one embodiment, the Jazz Web components are Open Services Gateway initiative (OSGi) bundles. As utilized herein, OSGi is defined as an open standards initiative, which specifies a Java-based service platform that can be remotely managed. In particular, OSGi provides a framework that defines an application life cycle model and a service registry.

In step 306, web component utility 148 generates cached strings of Javascript code using the located Jazz Web components. A determination is then made in step 308 by the web component utility 148 whether a browser, such as browser 146, is accessing a Jazz UI of an AJAX Web page (hereinafter, "Jazz Web page"). If it is determined in step 310 that the browser 146 is not accessing a Jazz Web page, then the process returns to step 308 and is repeated. However, if it is determined in step 308 that the browser 146 is accessing a Jazz Web page, then the Web component utility 148 uses simple script tags to access the cached Javascript in step 310. Web component utility 148 then executes the Javascript in step 312 to register available Jazz Web components with the AJAX framework 149. In one embodiment, the AJAX framework 149 is a Dojo Javascript Toolkit. As utilized herein, a Dojo Javascript Toolkit is defined as a modular open source Javascript Toolkit, also referred to as a library, that is designed to enable the rapid development of Javascript, AJAX-based applications, and Web sites.

In step 314, the Web component utility 148 serializes a subset of extension registry 137, which includes extension points 137a through 137n that are declared in the registered Jazz Web components. In one embodiment, the serialized subset of extension registry 137 utilizes a Javascript Object Notification (JSON) lightweight data interchange format. Then the Web component utility 148 parses the serialized subset in step 316 to make extension points 137a through 137n available via Javascript Application Programming Interfaces (APIs). In one embodiment, the Javascript APIs are clones of one or more APIs within extension registry 137 (e.g., "org.eclipse.core.runtime.IExtensionRegistry").

The Jazz Web page is then loaded in step 318 and application metadata for all controller functions are read using the Javascript APIs. In one embodiment, each controller function comprises a unique ID, which is typically expressed as a string following a reverse domain name service (DNS) naming convention (e.g., com.ibm.team.workitem.Web.actions.viewbug). Each controller function also comprises a named Javascript function appended to an object hierarchy matching the reverse DNS convention (e.g., com.ibm.team.workitem.Web.actions.viewbug). Each controller function likewise comprises a human-readable description that is displayed in the browser's title bar when the 'action' is invoked. Once the Jazz Web page is loaded, it is displayed in the browser in step 320.

Then, in step 322, the AJAX URL monitor 150 monitors the Jazz Web page URL in background at a predetermined rate (e.g., four times per second) for changes in its value. A determination is then made in step 324 whether the value of the Jazz Web page has changed. If it has not, then monitoring of the value of the Jazz Web page URL is continued in step 322. However, if it is determined in step 324 that the value of the Jazz Web page URL has changed, then the value of the 'action' property of the changed URL is determined in step 326.

As an example, a user clicks on a hyperlink within the Jazz Web UI page for the "viewBug" function for bug #1234. As a result, the browser URL is changed from:
    http://example.com/ajaxPage
to:
    http://example.com/ajaxPage#action=com.ibm.team.workitem.Web.actions.viewBug&id=1234

The extension registry is then accessed in step 328 and comparison operations are performed between the value of the 'action' property of the changed URL and extension registry data. A determination is then made in step 330 whether the ID of the 'action' property of the changed URL is valid. To continue the prior example, the comparison operations ensure that there is an 'action' with the ID "com.ibm.team.workitem.Web.actions.viewBug" defined in the extension registry. If there is not, then the changed URL, and its associated actions, is ignored in step 334, followed by continued monitoring of the value of the Jazz Web page URL in step 322. It will appreciated by those of skill in the art that checking the validity of the 'action' property of the changed URL against the extension registry data provides a means to prevent the running of arbitrary, and possibly malicious, code via the framework.

However, if it is determined in step 328 that the ID of the 'action' property of the changed URL is valid, then the function specified by the 'action' request parameter is called in step 334. As a result of the function call in step 334, a single object parameter is sent in step 336. The properties of the single object parameter are derived from the request parameters other than 'action'. To further continue the previous example, calling the function associated with the ID of the 'action' property results in the sending of a single Javascript object with the property {id:'1234'}. The function executes and the framework updates the AJAX page's title in the UI, substituting '1234' for the ${id} parameter. The user now sees a meaningful description in both the browser title and later in the browser history. As another example, the query string action=myAction¶m1=value1&param2=value2 would result in myAction being called with an object with structure {param1:'value1',param2:'value2'}. It will be apparent to those of skill in the art that additional links representing other UI states in the Jazz Web page could be executed in the same manner. Once the single object parameter is sent in step 336, a determination is made in step 338 whether to continue monitoring the value of the Jazz Web page URL. If so, then monitoring of the value of the Jazz Web page URL is continued in step 322. Otherwise, Jazz URL monitoring operations are ended in step 340.

It will be appreciated by those of skill in the art that the foregoing approach allows an AJAX application to behave like a normal Web page by using URLs to express UI states in an extensible, controlled manager. As a result, application components can contribute an infinite number of actions with their own parameter sets. It will be similarly appreciated that since the AJAX framework invokes controller actions, a component's AJAX code can be loosely coupled without direct code dependencies to another AJAX component's action through the creation of simple hyperlinks. In a similar fashion, it is possible for one component to reference an action of another component, but not actually load the second component's code until the first time it's used (i.e., when the hyperlink invoking the second component's controller action is invoked). Skilled practitioners of the art will similarly realize that the approaches described herein allow open-ended extension, but malicious users are prevented from invoking arbitrary functionality since valid controller actions are defined in the application metadata.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for managing the user interface (UI) state of an asynchronous Javascript and eXtensible mark-up language (AJAX) application, comprising:

enabling access to a Web page of an AJAX application with a browser, the Web page comprising a plurality of AJAX Web UI components;

generating AJAX Web UI component metadata for each of the plurality of AJAX Web UI components, the AJAX Web UI component metadata comprising:
a unique identifier (ID);
a named Javascript function; and
a human-readable description;

monitoring a value of a uniform resource locator (URL) bound to an AJAX Web UI component to determine whether the value of the URL has changed;

determining whether a unique ID of a changed URL exists in the AJAX Web UI component metadata;

calling the named Javascript function associated with the unique ID when a corresponding unique ID exists in the AJAX Web UI component metadata;

returning a Javascript object as a result of calling the named Javascript function, the Javascript object comprising a property value; and executing the named Javascript function to display the value of the named Javascript object property in the browser.

2. The method of claim 1, wherein the Web page of the AJAX application comprises a plurality of Web UI components stored in an extension registry, the plurality of Web UI components operable to extend an extension point, the extension point being exposed as a Uniform Resource Identifier (URI).

3. The method of claim 2, wherein cached strings of Javascript code are generated from the plurality of Web UI components.

4. The method of claim 3, wherein the cached strings of Javascript code are executed to register available Web UI components in an AJAX framework.

5. The method of claim 4, wherein a subset of the extension registry is serialized, the subset comprising a plurality of server side extension points declared within the plurality of available Web UI components registered in the AJAX framework.

6. The method of claim 5, wherein the serialized subset of the extension registry is parsed, the parsed serialized subset of the extension registry operable to be accessed through a Javascript Application Programming Interface (API) to determine whether an ID of an action property of a changed URL exists in the extension registry.

7. A system comprising:
a processor;
a data bus coupled to the processor; and
a computer-usable medium embodying computer program code, the computer-usable medium being coupled to the data bus, the computer program code managing the user interface (UI) state of an asynchronous Javascript and eXtensible mark-up language (AJAX) application and comprising instructions executable by the processor and configured for:

enabling access to a Web page of an AJAX application with a browser, the Web page comprising a plurality of AJAX Web UI components;

generating AJAX Web UI metadata for each of the plurality of AJAX Web UI components, the AJAX Web UI component metadata comprising:
a unique identifier (ID);
a named Javascript function; and
a human-readable description;

monitoring a value of a uniform resource locator (URL) bound to an AJAX Web UI component to determine whether the value of the URL has changed;

determining whether the unique ID of a changed URL exists in the AJAX Web UI component metadata;

calling the named Javascript function associated with the unique ID when a corresponding unique ID exists in the AJAX Web UI component metadata;

returning a Javascript object as a result of calling the named Javascript function, the Javascript object comprising a property value; and executing the named Javascript function to display the value of the Javascript object property in the browser.

8. The system of claim 7, wherein the Web page of the AJAX application comprises a plurality of Web UI components stored in an extension registry, the plurality of Web UI components operable to extend an extension point, the extension point being exposed as a Uniform Resource Identifier (URI).

9. The system of claim 8, wherein cached strings of Javascript code are generated from the plurality of Web UI components.

10. The system of claim 9, wherein the cached strings of Javascript code are executed to register available Web UI components in an AJAX framework.

11. The system of claim 10, wherein a subset of the extension registry is serialized, the subset comprising a plurality of server side extension points declared within the plurality of available Web UI components registered in the AJAX framework.

12. The system of claim 11, wherein the serialized subset of the extension registry is parsed, the parsed serialized subset of the extension registry operable to be accessed through a Javascript Application Programming Interface (API) to determine whether an ID of an action property of a changed URL exists in the extension registry.

13. A non-transitory computer-usable storage medium embodying computer program code, the computer program code comprising computer executable instructions configured for:

enabling access to a Web page of an AJAX application with a browser, the Web page comprising a plurality of AJAX Web UI components;

generating AJAX Web UI metadata for each of the plurality of AJAX Web UI components, the AJAX Web UI component metadata comprising:
a unique identifier (ID);
a named Javascript function; and
a human-readable description;

monitoring a value of a uniform resource locator (URL) bound to an AJAX Web UI component to determine whether the value of the URL has changed;

determining whether the unique ID of a changed URL exists in the AJAX Web UI component metadata;

calling the named Javascript function associated with the unique ID when a corresponding unique ID exists in the AJAX Web UI component metadata;

returning a Javascript object as a result of calling the named Javascript function, the Javascript object comprising a property value; and executing the named Javascript function to display the value of the Javascript object property in the browser.

14. The computer usable medium of claim 13, wherein the Web page of the AJAX application comprises a plurality of Web UI components stored in an extension registry, the plurality of Web UI components operable to extend an extension point, the extension point being exposed as a Uniform Resource Identifier (URI).

15. The computer usable medium of claim 14, wherein cached strings of Javascript code are generated from the plurality of Web UI components.

16. The computer usable medium of claim 15, wherein the cached strings of Javascript code are executed to register available Web UI components in an AJAX framework.

17. The computer usable medium of claim 16, wherein a subset of the extension registry is serialized, the subset comprising a plurality of server side extension points declared within the plurality of available Web UI components registered in the AJAX framework.

18. The computer usable medium of claim 17, wherein the serialized subset of the extension registry is parsed, the parsed serialized subset of the extension registry operable to be accessed through a Javascript Application Programming Interface (API) to determine whether an ID of an action property of a changed URL exists in the extension registry.

19. The computer usable medium of claim 13, wherein the computer executable instructions are deployable to a client computer from a server at a remote location.

20. The computer usable medium of claim 13, wherein the computer executable instructions are provided by a service provider to a customer on an on-demand basis.

* * * * *